United States Patent [19]

McCrae et al.

[11] Patent Number: 5,190,585
[45] Date of Patent: Mar. 2, 1993

[54] PRODUCTION OF PIGMENT COMPOSITIONS

[75] Inventors: James M. McCrae, Kilmarnock; Neil C. W. Forsythe, Glasgow, both of Scotland

[73] Assignee: Ciba-Geigy Corporation, Ardsley, N.Y.

[21] Appl. No.: 793,266

[22] Filed: Nov. 13, 1991

Related U.S. Application Data

[63] Continuation of Ser. No. 415,018, Sep. 29, 1989, abandoned.

[30] Foreign Application Priority Data

Oct. 6, 1988 [GB] United Kingdom ............... 8823483
Jul. 21, 1989 [GB] United Kingdom ............... 8916752

[51] Int. Cl.$^5$ ..................... C09B 27/00; C08K 5/00
[52] U.S. Cl. ..................... 106/493; 106/494; 106/496; 534/806; 534/816
[58] Field of Search ............... 106/493, 494, 496; 524/190, 559, 560, 561; 534/806, 816

[56] References Cited

U.S. PATENT DOCUMENTS

| | | | |
|---|---|---|---|
| Re. 27,575 | 2/1973 | Ribka et al. | 106/496 |
| 4,170,487 | 10/1979 | Robertson et al. | 106/309 |
| 4,177,082 | 12/1979 | Robertson | 106/309 |
| 4,192,841 | 3/1980 | Robertson et al. | 264/117 |
| 4,255,375 | 3/1981 | Macpherson et al. | |
| 4,317,908 | 3/1982 | Sakaguchi | 544/74 |
| 4,491,481 | 1/1985 | Robertson et al. | 106/288 |
| 4,664,710 | 5/1987 | Gleason et al. | |
| 4,765,841 | 8/1988 | Vinther et al. | |

FOREIGN PATENT DOCUMENTS

| | | |
|---|---|---|
| 0273236 | 7/1988 | European Pat. Off. . |
| 889042 | 9/1953 | Fed. Rep. of Germany . |
| 956709 | 1/1957 | Fed. Rep. of Germany . |
| 3031444 | 3/1981 | Fed. Rep. of Germany . |
| 6395270 | 4/1988 | Japan . |
| 301814 | 12/1954 | Switzerland . |
| 322874 | 8/1957 | Switzerland . |

OTHER PUBLICATIONS

Chem. Abstract 50:4518h-English abstract of Ger 889042.
Chem. Abst. vol. 54, 1868.
Chem. Abst. 25:13449 (1956).
Derwent Abst. C79-B87594.
Derwent Abst. 78-670 58A/38.
Derwent Abst. 81-237160/14.
Derwent Abst. 76-67242x/36.

*Primary Examiner*—William R. Dixon, Jr.
*Assistant Examiner*—C. M. Bonner
*Attorney, Agent, or Firm*—JoAnn Villamizar

[57] ABSTRACT

The present invention provides processes for the production of a pigment composition comprising: Ia) contacting a pigment, before or during its synthesis, with a water-immiscible carrier medium, and then completing the pigment synthesis to produce a pigment composition comprising the pigment and the water-immiscible carrier medium, and Ib) contacting the resulting aqueous fully-synthesized pigment composition with an aliphatic organic acid and optionally a water-immiscible carrier medium; adjusting the pH value of the mixture so obtained to below 7.0; and then adjusting to the pH value of the mixture to a value above 7.0 thereby transferring the organic acid into the aqueous phase; and isolating a pigment composition comprising the pigment and the water-immiscible carrier medium, or II) contacting an aqueous fully-synthesized pigment slurry with an aliphatic organic acid and a water-immiscible carrier medium according to above step Ib).

13 Claims, No Drawings

PRODUCTION OF PIGMENT COMPOSITIONS

This application is a continuation of application Ser. No. 415,018, filed Sep. 29, 1989 now abandoned.

The present invention relates to processes for the production of pigment compositions, and to the use of pigment compositions so obtained in the colouration of printing inks and paints.

It is well known that pigment compositions, including a carrier, may be formulated to give a non-powder form. The carriers used in such systems are carefully chosen to best facilitate the incorporation of the pigment composition into the final applicational medium. The underlying principle, in the manufacture of these types of pigment preparation, is that organic pigment, having a greater affinity for an oily, rather than an aqueous phase, is able to be transferred from the aqueous phase of systhesis into an appropriate oily or organic phase. The transfer process features, and equipment used in this type of process, are variable, and several chemical and mechanical aids have been described.

Advantages of pigment preparations of this kind, over conventional powder, include e.g., the fact that the pigment does not require drying to the same extent (if at all), since most of the water is excluded at the "flushing" stage, nor need the pigment be ground. Further, the pigment is in a more readily usable form, and should require less work to disperse it into the applicational medium. Problems which are associated with conventional pigment usage, such as dusting and non-meterability, may also be overcome using flushed pigment.

Patent Kokai Sho 63-95270 (Toyo Ink) describes a method whereby a granular colouring agent may be prepared by flushing a pigment slurry directly into an oil varnish, using a high speed dispersing machine. The varnish used is a rosin modified phenolic resin in a high boiling petroleum distillate.

U.S. Pat. No. 4,765,841 (KVK) describes the preparation of an organic pigment dispersion in non-aqueous media by mixing the aqueous pigment slurry, in the presence of a dispersing agent, with the non-aqueous medium, under vigorous agitation. The pigment dispersion is isolated, still containing e.g. 35% of water, and this dispersion is de-watered by a two-roller technique. The product is a pigment concentrate of typically 60% of pigment.

EP Patent Application No. 0273236 (BASF) describes the preparation of an ink by adding to a pigment slurry, an emulsion consisting of e.g. oleophilic resins, organic solvents and mixtures thereof, an emulsifying agent and water. The pigment/emulsion mix is then concentrated, and an ink is prepared directly from this concentrate.

In each of these known processes, the incorporation of the oleophilic carrier medium with the pigment is carried out:

a) on fully synthesized pigment i.e. after the pigment-making reaction is completed, and b) a resin is used either as a solution in e.g. distillate; or in the form of an emulsion, in which case the use of an emulsifying agent is required.

Moreover, in British Patent Specification No. 1589159, an organic acid is added, as an aftertreatment, to pigment slurry whereby the pigment substantially transfers into the organic acid at a low pH. Alkali is subsequently added to solubilise the acid in the aqueous phase, and the pigment, in the form of a bead, is isolated, substantially acid-free.

We have now found that by incorporating a water-immiscible carrier medium in a novel manner, the pigment product has both improved physical properties and improved manufacturing economics.

Accordingly, the present invention provides processes for the production of a pigment composition comprising:

Ia) contacting a pigment, before or during its synthesis, with a water-immiscible carrier medium, and then completing the pigment synthesis to produce a pigment composition comprising the pigment and the water-immiscible carrier medium and Ib) contacting the resulting aqueous fully-synthesized pigment composition with an aliphatic organic acid and optionally a water-immiscible carrier medium, adjusting the pH value of the mixture so obtained to below 7.0; and then adjusting the pH value of the mixture to a value above 7.0 thereby transferring the organic acid into the aqueous phase; and isolating a pigment composition comprising the pigment and the water-immiscible carrier medium, or II) contacting an aqueous fully-synthesized pigment slurry with an aliphatic organic acid and a water-immiscible carrier medium according to the above step Ib).

In aspect Ia) of the process I) of the present invention, the water-immiscible carrier medium may be contacted with one or more of the pigment precursors e.g. a diazo or tetrazo component or an azo coupling component, or may be added to the pigment synthesis vat, either before or during the pigment synthesis reaction. The carrier medium may be added in the form of a melt; a solution; if feasible, as a simple organic liquid; or as an emulsion, optionally in combination with an emulsion stabilizer.

The water-immiscible carrier medium used in aspect Ia), optionally Ib) of the process I) or in process II) of the present invention may be any such medium which is normally present in the intended final surface coating composition e.g. a printing ink system. Depending on the final application, other compatible carriers may be employed. Examples of carrier media include resins such as alkyd or phenolic resins, or modifications thereof, e.g. rosin-modified phenolics; rosin or rosin derivatives; or maleic-, acrylic- or other resins known to be useful in the preparation of printing inks. Non-resins may be used such as distillate oil of boiling range 260°-290° C., vegetable oil and derivatives thereof, linseed or tung oil. Various co-additives such as surfactants, wetting agents, emulsifying agents and dispersing agents may optionally be used, each of which can aid the processing and/or applicational uses of the pigment concentrate. Further additions, e.g. dyestuffs conventionally used in pigment slurry manufacture, and known to aid pigment performance, may also be used.

The aliphatic organic acid used in aspect Ib) of the process I) or in process II) of the present invention is preferably a $C_5$–$C_{18}$ linear or branched, saturated or unsaturated carboxylic acid. More preferred acids are $C_6$–$C_{10}$ straight- or branched chain saturated alkane carboxylic acids e.g. n-hexanoic acid, n-heptanoic acid, 2-ethylhexanoic acid, n-octanoic acid, n-nonanoic acid and n-decanoic acid.

The relative proportions of pigment and organic carrier in the final pigment composition may vary within a wide range and pigment/carrier proportions may range between 1:2 and 20:1 by weight. It will be apparent that not all of this carrier medium to be used needs to be added according to one single process aspect Ia) or Ib).

Use of both process aspects Ia) and Ib) may be employed to build up the full carrier medium component desired.

The degree of shear applied during either the process aspects Ia) or Ib) or the process II) of the present invention will depend upon the viscosity of the pigment composition produced, and consequently upon the amount of carrier added to the pigment slurry. Conventional stirrers, such as those typically employed in the preparation of pigment slurries, may be used. If desired, higher shear may be applied e.g. using a high speed mixer/emulsifier such as those manufactured by Silverson Manchines Ltd. Ultrasound, at about 20 kHz, may also be used e.g. from an ultrasonic probe.

The processes of the present invention can be adapted to the continuous production of pigment compositions e.g. in a bead mill.

The product of the processes of the present invention may be isolated by any conventional technique e.g. in a filter press or a band filter; by using a vibrating sieve; by centrifuging; or by suction. The pigment composition may then optionally be dried e.g. in an oven, microwave oven or by a non static technique e.g. in a fluidised bed. The aqueous content of the final pigment composition may range from below 1% to 75% by weight.

The physical form of the pigment composition obtained according to the processes of the present invention may range from a liquid paste to a dried granule, depending upon the level of drying applied, the mode of isolation and the ratio of carrier in the pigment. On isolation, prior to drying, the aqueous content of the composition may typically be around 40% by weight.

The pigment component in any of these compositions may be any organic pigment used in printing inks. Suitable pigments include azo, azomethine or metal salts of these, dioxazine, quinacridone, anthraquinone, isoindoline, isoindolinone or phthalocyanine pigments. Mixtures of pigments may be used. Azo pigments are preferred.

Pigment compositions produced by the processes of the present invention are obtained in a readily usable form, are low dusting or non dusting, do not require grinding and require less drying than conventional pigment compositions. In addition, the pigment compositions produced by the processes of the present invention have further advantages in production over known compositions. Factors which contribute to the said advantages to this include:

i) Heat up after synthesis, generally associated with conventional pigment in purely aqueous slurry manufacture, may be shortened;

ii) The use of organic carrier media as an oil-in-water emulsion, rather than an organic liquid, is preferred, on a plant scale, for safety reasons and has the added advantage that conventional steam-pipe heated vessels may be used;

iii) Compositions, especially those using an organic acid as part of their processing, as described in aspect Ib) of process I) or in process II) may be used in bead-form. The compositions produced according to the process of the present invention, therefore, have the advantage that they may be isolated more easily and quickly and may be washed salt-free with substantially less water than previous compositions; and iv) Resin carrier systems in distillate or emulsion which may be desired in a pigment composition may not be easily formed into an easily usable solution. The use of an organic acid, added in conjunction with the carrier system, enables previously unworkable ratios of resins and distillate to be easily incorporated into the pigment composition.

Applicationally, inks and paints produced from a pigment composition produced according to the processes of the present invention have advantages in terms of colour strength, gloss, transparency etc.

It is genuinely surprising that the synthesis of especially azo pigments in the presence of mixed aqueous and organic phases occurs without loss of pigment performance, e.g. without occurence of crystal growth. Further the presence of the organic phase at the synthesis stage enables pigment additives, incompatible with an aqueous system and previously only employed at a later stage e.g. during the production of printing ink, to be incorporated into the pigment formulation.

The use of an organic acid as an aftertreatment viz. according to aspect Ib) of process I) or to process II) of the present invention, has the advantage that it allows pigment in ink carrier compositions of this type to be prepared in a non-dusting, meterable bead form. Further, when aftertreatment in this way, the applicational properties of these pigment compositions are improved.

The following Examples further illustrate the present invention.

EXAMPLE 1

A slurry around 200 g of Pigment Yellow 13 is prepared by coupling together 3,3'-dichlorobenzidine (DCB) tetrazo and acetoacet-2,4-dimethylanilide (AAMX). The tetrazo component is based on 107 g of DCB at circa 70.4% purity, tetrazotised in HCl acid conditions with 42.5 g of $NaNO_2$, the product being cleaned with activated charcoal and filtered. The coupling component contains 127 g of AAMX, carefully reprecipitated with acetic acid, giving a slurry at pH 6.0. Also present in the coupling component slurry are 1.6 g of ®Jaguar CP-13, an ethyl cellulose-based colloidal stabiliser, 2.5 g of a 75% active ®Arquad 2HT quaternary ammonium salt [di(hydrogenated tallow) dimethyl ammonium chloride], and 12.5 g of 40% active dyestuff compound made from coupling AAMX with tetrazotised benzidine 2,2'-disulphonic acid. Coupling takes place over approx. 1 hour at pH 5.8–6.0. After coupling, the pH of the slurry is lowered to 5.0 using dilute HCl and the slurry is then steam heated to 70° C. Whilst paddle stirring at this temperature, a solution comprising 100 g of an aliphatic distillate b.pt. 260°–290° C., 200 g of ethyl hexanoic acid and 33 g of a phenolic resin modified by a mixture of rosin and hydrocarbon are added. This mixture is then blended for 30 minutes. The pH of the slurry is then raised to 8.0, using ammonia, and stirred for a further 30 minutes, during which time the organic acid dissolves into the aqueous phase. The product is isolated on a sieve, washed with cold water and dried in an oven at 60° C., until the aqueous content is below 5%. The product is dispersed to give an ink of excellent colour strength, transparency and gloss.

EXAMPLE 2

A slurry of Pigment Yellow 13 is prepared as in Example 1 except that, after coupling, the pH of the slurry is raised to 8.0, heated to 90° C., and an alkali solution containing 80 g of an abietic acid based rosin is added. This is stirred for 10 minutes at circa pH 10 before the pH of the slurry is reduced to 5.0. The temperature is adjusted to 70° C. and the remaining procedure described in Example 1 is performed.

EXAMPLE 3–10

The procedure described in Examples 1 and 2 is repeated using each of the following types of resins as replacement for the hydrocarbon modified rosin (Example 2) or modified phenolic resin (used in Example 1):

Alkyd resin viz ®Lawter 100S (Examples 3 and 4); phenolic resin which has been partly esterified with rosin and partly with glycerol, ®Krumbhaar K101 (Examples 5 and 6); Rosin modified resin ®Kelrez 42-405 (Examples 7 and 8); Hydrocarbon resin viz ®Hercules A120 (Examples 9 and 10).

EXAMPLE 11

A slurry of pigment red 57:1 consisting of 350 g of pigment is prepared as follows from diazo and coupling component precursor. The coupling component consists of a solution of 159 g or $\beta$-hydroxy-naphthoic acid dissolved in KOH, with which is mixed a further solution consisting of 70 g of an abietic acid-based rosin, also dissolved in KOH. The diazo component comprises 155 g of 2-amino-5-methyl-benzene sulphonic acid, diazotised in HCl acid conditions, using 53 g of sodium nitrite to form a slurry. A further 168 g of circa 80% active $CaCl_2$ is dissolved in this slurry. Simultaneous coupling using the components takes place over 45 minutes at pH 10.8–11.0. One hour after coupling, the pH value of the slurry is reduced to 5.0, the slurry is heated to 70° C. and 3.5 g of hydroxy ethyl cellulose are added as an aqueous solution. A carrier solution comprising 105 g of an aliphatic distillate b.pt. 260°–290° C., 350 g of 2-ethyl hexanoic acid and 58 g of a phenolic resin modified by a mixture of rosin and hydrocarbon are added. The slurry is paddle-stirred for 30 minutes before its pH value is raised to 8.0, after which the slurry is stirred for a further 30 minutes. The pigment product in a bead form is isolated on a 60 mesh screen (screen having 250 $\mu$m apertures) and dried in an oven at 60° C. until the aqueous content was circa 2% by weight.

EXAMPLES 12–15

The procedure of Example 11 is repeated except that each of the following types of resin is used as replacements for the phenolic resin used in Example 11:

Alkyd resin ®Lawter 100S (Example 12); phenolic resin which has been partly esterified with rosin and partly with glycerol [®Krumbhaar K101] (Example 13); or phenolic resin which has been partly esterified with rosin and partly with pentaerythritol [®Kelrez 42-405] (Example 14); or hydrocarbon resin ®Hercules A120 (Example 15).

EXAMPLE 16

The procedure of Example 11 is repeated but using, as a carrier system, a solution containing 105 g of aliphatic distillate b.pt. 260°–290° C.; 350 g of 2-ethyl hexanoic acid; 58 g of a phenolic resin modified by a mixture of rosin and hydrocarbon and 7 g of linseed oil.

EXAMPLE 17

A slurry of Pigment Yellow 13 is prepared from tetrazo and coupling component precursors as follows: The tetrazo component comprises 30.8 g of 3,3'-dichlorobenzidine of 70.4% purity, tetrazotised in HCl acid conditions with 12.0 g of sodium nitrite. The coupling component, consisting of 36.5 g of acetoacetmetaxylidide (AAMX), is finely reprecipitated with acetic acid to give a slurry at pH 6.0. In this slurry are also present 10 g of an aliphatic distillate of b.pt. 260°–290° C., 0.5 g of ®Jaguar CP-13 (colloidal stabiliser); 1.8 g of a dyestuff compound made from coupling AAMX with tetrazotised benzidine-2,2'-disulphonic acid; and 0.86 g of a quaternary ammonium salt (according to Example 1). Coupling is effected at pH 4.6–4.7 over 30 minutes; the pH of the coupling suspension is then raised to 7; and a solution containing 30 g of an abietic acid based rosin is added. The slurry is heated to 80° C.; stirred for 10 minutes; pH is lowered to 5.5 using HCl; the reaction mixture is cooled to 70° C. and filtered. The product is washed with cold water, and then oven-dried at 60° C. until the aqueous content is circa 2%.

EXAMPLE 18

The process of Example 17 is repeated, except that, after rosin addition, the pH of the slurry is lowered to 5.0 once the temperature of the slurry is adjusted to 70° C.; 80 g of 2-ethyl hexanoic acid are added; and the mixture is stirred for 30 minutes. The pH of the mixture is then raised to 8.0; the mixture is stirred for a further 30 minutes before the product is isolated on a sieve. The product is washed with cold water and then oven dried until the aqueous content was 1%.

EXAMPLE 19

The procedure of Example 18 is repeated, except that, after rosin addition, the temperature is adjusted to 70° C.; the sodium salt of 2-ethyl hexanoic acid is added to an extent such that the acid content is similar to that in Example 18, and then the pH of the mixture is lowered to 5, and the suspension is then stirred for 30 minutes before the after-treatment of Example 18 is applied.

EXAMPLE 20

A slurry of beta copper phthalocyanine (Pigment Blue 15:3) is prepared containing 100 g of pigment. This slurry is heated to a temperature of 70° C. at pH 5.0; a solution containing 1 g of hydroxy ethyl cellulose is added and the mixture is stirred for 5 minutes. A further solution containing 100 g of 2-ethyl hexanoic acid, 50 g of an aliphatic distillate of b.pt. 260°–290° C. and 25 g of a phenolic resin modified by a mixture of rosin and hydrocarbon is added. The mixture is paddle-stirred for 30 minutes, the pH of the mixture is then raised to 8.0 with ammonia, stirred for a further 30 minutes and the product is filtered through a sieve, washed with cold water and oven-dried until the aqueous content is 1%.

EXAMPLES 21–24

The procedure of Example 20 is repeated except that there is used, as a replacement for the rosin/hydrocarbon-modified phenolic resin, one of the following:

Alkyd resin ®Lawter 100S (Example 21); phenolic resin which has been partly esterified with rosin and partly with glycerol, ®Krumbhaar K101 (Example 22); or phenolic resin which has been partly esterified with rosin and partly with pentaerythritol [®Kelres 42-405] (Example 23); or hydrocarbon resin ®Hercules A120 (Example 24).

EXAMPLE 25

A sample of Pigment Yellow 13 is prepared using the procedure of Example 17 except that the aliphatic distillate of b.pt. 260°–290° C. is added to the coupling component in the form of an emulsion. The emulsion comprises 10 g of the aliphatic distillate, 1 g of abietic acid-based rosin, 0.5 g of sodium hydroxide (50% liquor) and 30 g of water. The product is coupled and finished, as described in Example 17.

We claim:

1. In an aqueous process for the production of an azo pigment composition which comprises contacting an azo pigment precursor selected from the group consisting of a diazo or tetrazo component or an azo coupling component with a water immiscible carrier medium, the azo pigment being produced by reacting one or more azo pigment precursors selected from the group consisting of a diazo or tetrazo component or an azo coupling component in a synthesis vat, the improvement comprising contacting, before or during the synthesis of the azo pigment, said one or more azo pigment precursors selected from the group consisting of a diazo or tetrazo component or an azo coupling component with the water immiscible carrier medium and then completing the azo pigment synthesis to produce the azo pigment and the water immiscible carrier medium.

2. A process according to claim 1 wherein the carrier medium is added in the form of a melt, a solution, a liquid, or as an emulsion.

3. A process according to claim 2 wherein the carrier medium is added in combination with an emulsion stabilizer.

4. A process according to claim 1 wherein the carrier medium is a resin or a modification thereof, rosin or a rosin derivative, or an oil.

5. A process according to claim 4 wherein the resin is an alkyd-or a phenolic resin or a rosin modification thereof, or a maleic- or acrylic resin.

6. A process according to claim 4 wherein the oil is a distillate oil boiling in the range of from 260°–290° C., a vegetable oil or derivative thereof, linseed oil or tung oil.

7. A process according to claim 1 wherein the relative proportion of pigment to carrier medium in the final pigment composition ranges from 1:2 to 20:1 by weight.

8. A process according to claim 1 wherein the aqueous content of the final pigment composition ranges from less than 1% to 75% by weight.

9. In an aqueous process for the production of an azo pigment composition which comprises contacting an azo pigment precursor with a water immiscible carrier medium, the azo pigment being produced by reacting one or more azo pigment precursors in a synthesis vat, the improvement comprising contacting, before or during the synthesis of the azo pigment, said one or more azo pigment precursors with the water-immiscible carrier medium, and then completing the azo pigment synthesis to produce the azo pigment and the water immiscible carrier medium; further comprising the steps of contacting the aqueous fully-synthesized pigment composition with a $C_5$–$C_8$ linear or branched, saturated or unsaturated aliphatic carboxylic acid and a water immiscible carrier medium selected from the group consisting of a resin, modified resin, rosin, a rosin derivative and an oil; adjusting the pH value of the mixture so obtained to below 7.0; then adjusting the pH value of the mixture to a value above 7.0 thereby transferring the carboxylic acid into the aqueous phase; and isolating the pigment composition comprising the pigment and the water-immiscible carrier medium.

10. A process according to claim 9 wherein the acid is a $C_6$–$C_{10}$ straight or branched chain saturated alkane carboxylic acid.

11. A process according to claim 1 wherein the azo pigment precursor is a diazo or tetrazo component and an azo coupling component.

12. In an aqueous process for the production of an azo pigment composition which comprises contacting an azo pigment precursor with a water immiscible carrier medium, the azo pigment being produced by reacting one or more azo pigment precursors in a synthesis vat, the improvement comprising contacting, before or during the synthesis of the azo pigment, said one or more azo pigment precursors with a water immiscible carrier medium selected from the group consisting of a resin, modified resin, rosin, a rosin derivative and an oil and then completing the azo pigment synthesis to produce the azo pigment and the water immiscible carrier medium; further comprising the steps of contacting the aqueous fully-synthesized pigment composition with a $C_5$–$C_8$ linear or branched, saturated or unsaturated aliphatic carboxylic acid; adjusting the pH value of the mixture so obtained to below 7.0; then adjusting the pH value of the mixture to a value above 7.0 thereby transferring the carboxylic acid into the aqueous phase; and isolating the pigment composition comprising the pigment and the water-immiscible carrier medium.

13. A method for making a printing ink or paint having improved strength, gloss and transparency comprising incorporating an effective strength, gloss and transparency improving amount of the azo pigment composition prepared according to claim 1 into said printing ink or paint base.

* * * * *